C. M. BURNS.
LOCOMOTIVE HEADLIGHT CONTROL.
APPLICATION FILED MAY 7, 1914.
1,109,160.
Patented Sept. 1, 1914.
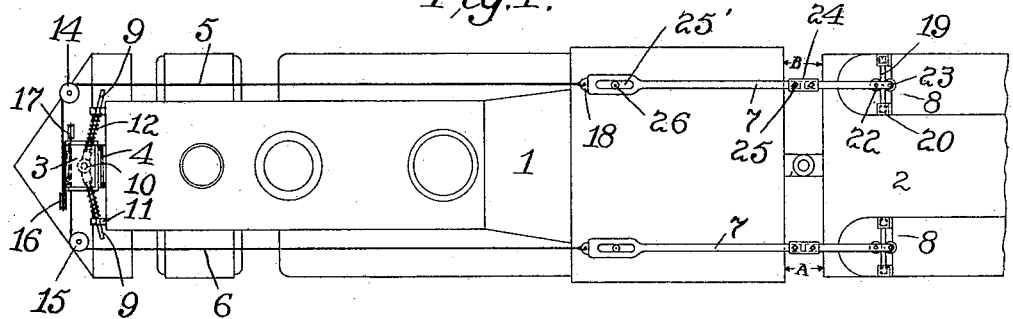
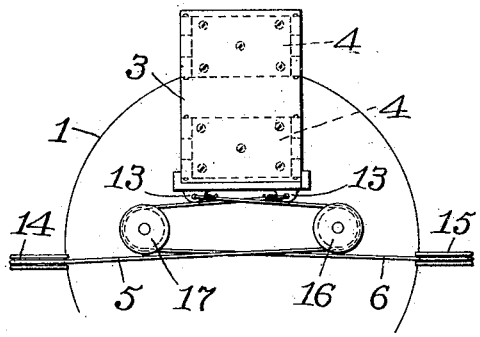
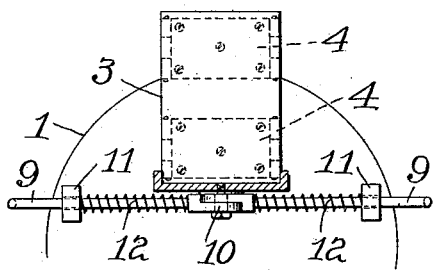
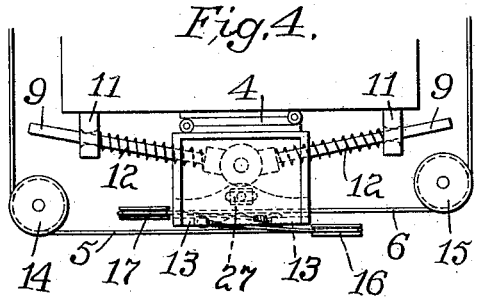
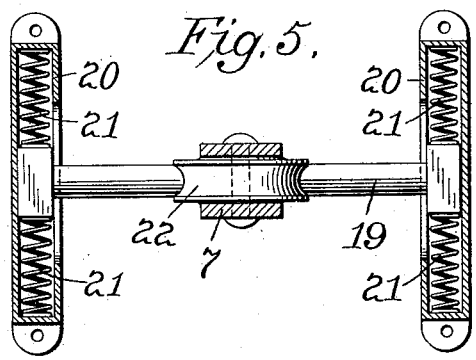
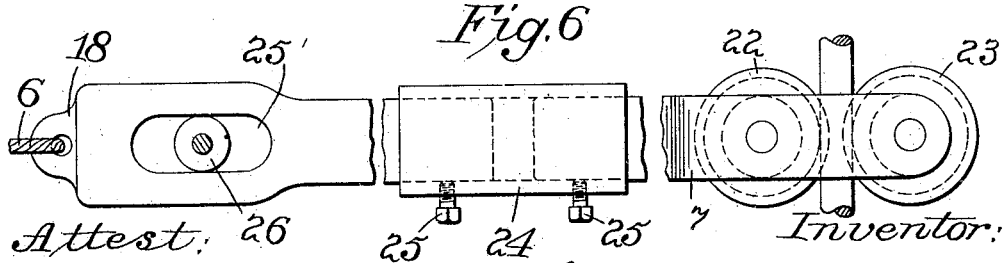
Attest:
Edwd R. Tolson
Bessie L. Bishop.
Inventor:
Charlie M. Burns,
by Spear, Middleton, Donaldson & Spear
Attys.

UNITED STATES PATENT OFFICE.

CHARLIE MATTHEW BURNS, OF MAYSVILLE, GEORGIA.

LOCOMOTIVE-HEADLIGHT CONTROL.

1,109,160.  Specification of Letters Patent.  Patented Sept. 1, 1914.

Application filed May 7, 1914. Serial No. 837,035.

*To all whom it may concern:*

Be it known that I, CHARLIE MATTHEW BURNS, citizen of the United States, residing at Maysville, Banks county, Georgia, have invented certain new and useful Improvements in Locomotive-Headlight Control, of which the following is a specification.

This invention relates to a locomotive headlight control, and has for its object the providing of means whereby the light will automatically follow the track when rounding curves.

The invention consists in the construction and arrangement and combination of parts hereinafter described and particularly pointed out in the claims, it being understood that I do not wish to limit myself to the details of the different parts of my invention.

The invention is illustrated in the accompanying drawings in which—

Figure 1 shows diagrammatically the device applied to a locomotive and its tender; Fig. 2 is a front elevation of the headlight bracket and its connections; Fig. 3 is a detail of the spring centering device; Fig. 4 is a detail plan view of the headlight bracket and its connections; Fig. 5 is a vertical transverse section of one of the tender connections; Fig. 6 is a fragmental detail of the connecting rod between engine and tender.

In the drawings, 1 indiciates a locomotive and 2 a tender coupled together in the usual manner. A headlight of any desired type is shown mounted upon a bracket 3 that is pivoted to the engine at 4 with its pivotal movement controlled by cords 5 and 6 together with rods 7 running therefrom to the tender 2, whereupon they are secured by vibration absorbing devices 8 more fully shown in Fig. 5. The headlight bracket 3 is pivoted to the engine so that it may turn either to the right or left, and is held normally to throw a beam of light straight ahead of the engine by means of rods 9 pivoted thereto at 10, and extending at each side of the light into bosses 11 on the engine with springs 12 encircling them to produce the centering action.

Lugs 13 are provided on the headlight bracket to which are attached the controlling cords 5 and 6, they being attached to the lug on the opposite side of the engine from which they run by passing over horizontal pulleys 14 and 15, and vertical pulleys 16 and 17. The cords 5 and 6 are connected to the rods 7 at some suitable point as 18 from whence the rods run to the tender where their ends are secured in the following manner: Carried by the tender are two shafts 19, one on each side thereof, slidably held in two guideways 20, and held normally central thereof by means of springs 21 in each guideway bearing upon the shaft 19. The guideways 20 are situated at right angles to the track and allow for the ordinary transverse vibration of the rods. The end of each rod 7 carries two rollers 22 and 23 between which passes the shaft 19 for providing for a certain amount of vertical movement of the rods. At some suitable point between the engine and tender, a sleeve 24 or other telescopic connection is provided on each rod with adjusting screws 25 thereon so that the rods may be either lengthened or shortened to correspond with the slack between engine and tender. The rods 7 preferably pass through the cab of the engine and where they do, a slot 25' is provided in the rods into which project roller pins 26 secured to the wall or other part of the cab to prevent undue vertical vibration or movement of the rods.

In operation, the headlight is normally directed straight ahead as in the usual construction at present, and remains so as long as there are no curves in the track. When a curve is entered—for sake of illustration, let us say to the right—the distance at A between tender and engine will be increased while that at B will diminish as is well known. As the distance at A, then increases, the rod 7 on the left is pulled back in relation to the engine by the tender which in turn operates the cord 6 passing around the horizontal pulley 15 and over the vertical pulley 17 whereby the headlight carrying bracket is moved to the right and follows the track. The degree of curve influencing the distance at A, the pull of the tender on the rod 7 and its cord 6 varies accordingly and the headlight is moved the desired amount to perfectly follow the track around the curve. When straight track is reached again, the distances at A and B become equal again with the resulting return of the rod to its initial position, which tends to return the light to its normally central position but the springs 12 and rods 9 make this centering action positive. My particular form of device at 8 permits both horizontal and vertical vibration of the rods 7 to be absorbed.

The headlight bracket is of a shape and size to allow any type of headlight now in use to be used therewith and any fastening means may be used for maintaining the light rigid upon the bracket. The bracket may be pivoted in any desired place and manner upon the engine, but I prefer to secure it thereto with two-way hinges. If the weight of the headlights used requires it, I may provide a roller 27 under the bracket upon which it may bear to help support the weight.

The centering springs 12 are preferably made very strong to prevent the vibration of the engine from jarring the headlight out of line. This will not affect the turning operation thereof, as it can be understood that the pull of the tender upon the bracket is very positive, and will overcome the action of the springs however strong they may be.

The vibration absorbing securing devices 8 for the rods are not necessarily placed upon the sides of the tender so shown in the drawings, as in practice their position in relation to each other and the pivotal movement of the tender will have to be determined by experiment so that the headlight will be moved just the proper amount in relation to the movement of the tender.

I claim as my invention:

1. A system of automatic headlight control comprising a pivotally mounted headlight support, flexible connections between said bracket and the tender, and vibration absorbing securing devices on the tender for said connections.

2. A headlight control comprising a pivotally mounted headlight support, operating connections therefor, and vibration absorbing securing means for said connections upon the tender including guideways, a rod slidably held therein, and means for movably connecting said connections upon said rod.

3. A headlight control comprising a pivotally mounted headlight support, operating connections therefor, and vibration absorbing securing means for said connections upon the tender including guideways, a rod slidably held therein, spring centering means for said rod, and means for movably connecting said connections upon said rod.

In testimony whereof, I affix my signature in presence of two witnesses.

CHARLIE MATTHEW BURNS.

Witnesses:
   C. E. PARSONS,
   BENNETT S. JONES.

Copies of this patent may be obtained for five cents each, by addressing the "Commissioner of Patents, Washington, D. C."